Feb. 20, 1923.　　　　　　　　　　　　　　　1,446,393
H. J. M. PENY
SPRING WHEEL FOR VEHICLES
Filed Apr. 12, 1922　　　　　2 sheets-sheet 1
Fig. 1.　　　　Fig. 2.
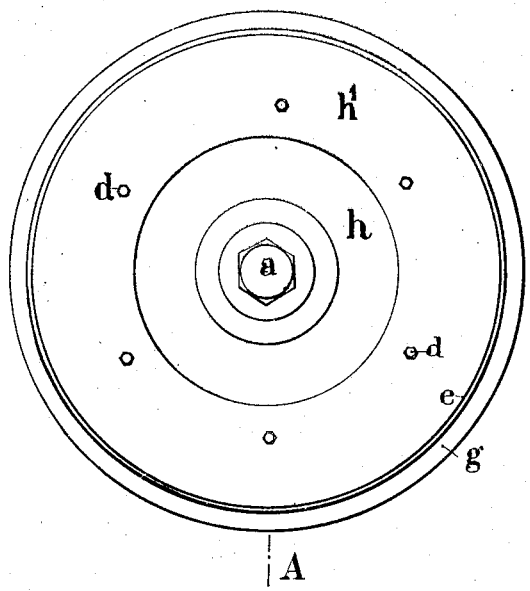
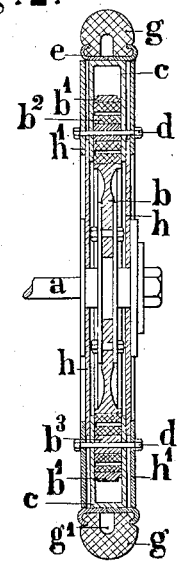
Fig. 6.
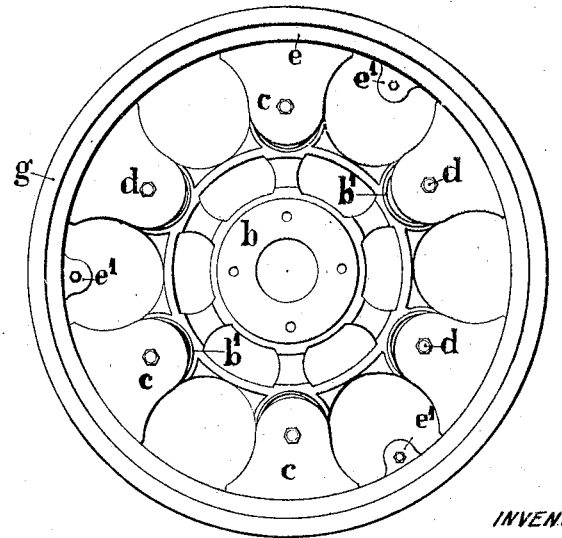
INVENTOR
Hippolyte J.M. Peny
BY
ATTORNEYS Feb. 20, 1923.

H. J. M. PENY

SPRING WHEEL FOR VEHICLES

Filed Apr. 12, 1922

INVENTOR
Hippolyte J.M. Peny
BY
ATTORNEYS

Patented Feb. 20, 1923.

1,446,393

UNITED STATES PATENT OFFICE.

HIPPOLYTE JEAN MARIE PENY, OF PARIS, FRANCE.

SPRING WHEEL FOR VEHICLES.

Application filed April 12, 1922. Serial No. 551,851.

*To all whom it may concern:*

Be it known that I, HIPPOLYTE JEAN MARIE PENY, director of insurance agency, of 6 Rue de Milan, Paris, France, have invented Improvements in Spring Wheels for Vehicles, of which the following is a full, clear, and exact description.

This invention relates to a spring or elastic wheel for vehicles, and more particularly motor-cars, characterized by a combination of parts which cooperate simultaneously to impart to said wheel an elasticity which can be compared with the one obtained by the use of pneumatic tyres without having the disadvantages of the latter.

To this purpose, this wheel comprises:

1st. The combination of an elastic device mounted upon the driving-axle and of an elastic device mounted upon the rim, both of them being separate but completing each other;

2nd. An elastic device mounted upon the driving axle, the latter, which acts as shock-reducer or absorber comprising a collar around which are radially located elastic groups adapted to connect this collar or hub with the rim of the wheel through the medium of cheek connecting means or parts;

3rd. An elastic device mounted upon the rim and comprising a tyre provided with an internal recess which allows a circulation of the air passing through ports or holes made in the rim, and used for the constant cooling of the cover;

4th. A rim made of two lateral parts or cheeks adapted to enclose, when connected by means of transverse bolts, the recessed or hollowed elastic tyre;

5th. Cheeks made two concentric parts partly covering each other and used for protecting the inner parts of the wheel without disturbing the elastic operation of these parts.

The advantages obtained with this system of wheel are as follows:

1st. In virtue of the rational distribution of the elasticity or springiness of the wheel, the point of contact of the latter with the ground is comparatively small whilst being still greatly sufficient to avoid any skidding; furthermore, the steering is much easier when rolling and the wearing of roads is considerably reduced.

2nd. The smooth starting is insured according to the relative independence of the axle with reference to the wheel, which prevents the breaking of this axle, also of the road axle and of the suspension springs.

3rd. The reactions due to unevenness of the ground which can be met on the way are entirely absorbed by the combination of the central elastic shock-absorbers or buffers with the recessed or grooved elastic tyre.

4th. The rim made of two parts arranged side by side allows to put the tyre in and out of place.

This invention will be hereinafter described with reference to the accompanying drawing in which:

Fig. 1 shows in side elevation the whole of this wheel;

Fig. 2 is a vertical cross-section made according to line A—A of Fig. 1;

Fig. 6 is a side-view of the rim, the cheek being removed;

Figure 3:
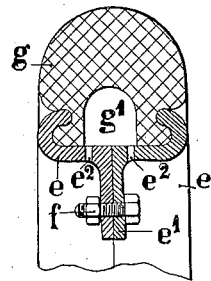
Fig. 3 shows in cross-section to a larger scale the tyre of this wheel.
Figure 4:
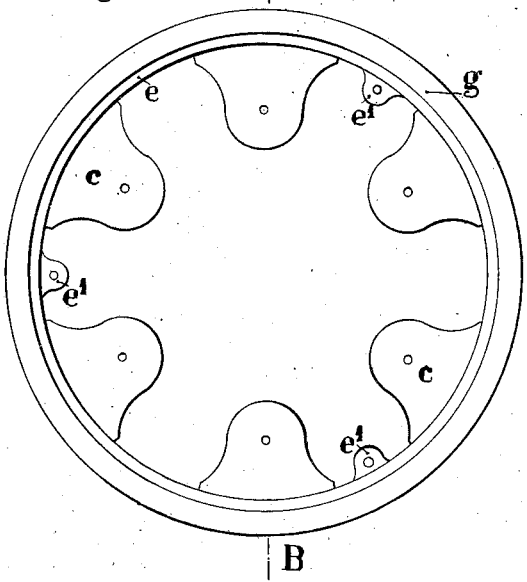
Fig. 4 is a side-view showing the whole of the wheel rim.
Figure 5:
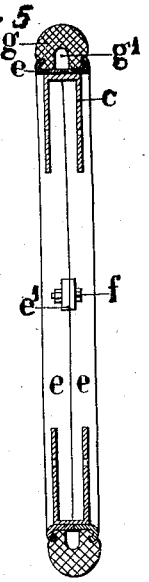
Fig. 5 is a vertical cross-section made according to line B—B of Fig. 4.
Figure 7:
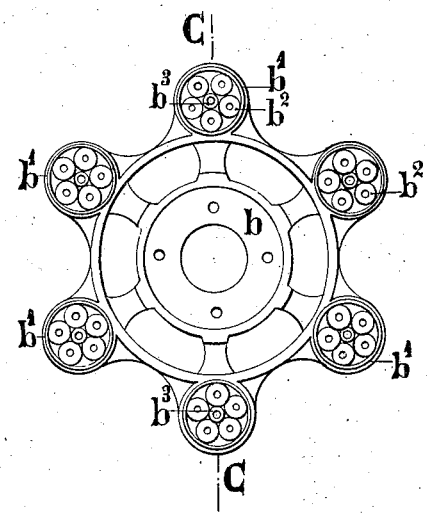
Fig. 7 shows separately the whole of the central elastic system of this wheel.
Figure 8:
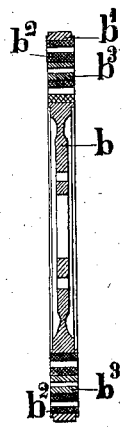
Fig. 8 is a vertical cross-section made according to line C—C of Fig. 7.

As shown in the drawing, this spring wheel for vehicles comprises, around the axle $a$, a collar $b$ provided upon its periphery with a certain number of radiating circles $b^1$ made in one with this collar and in each of which are located india-rubber cylinders $b^2$ arranged in a group around the central socket $b^3$.

The whole of this collar constitutes the central shock-absorber or buffer forming one part with the axle.

This central absorber is mounted in a series of shells $c$ the number of which is equal to that of the elastic groups.

A connecting bolt $d$ passes through each one of these shells and the central sockets of the elastic groups.

These shells are secured to one of the two parts of the rim $e$ of the wheel which is formed of two circles arranged side by side and connected by cross-bolts $f$ engaged in lugs $e^1$ cast in one piece with said circles.

The circles constitute each one-half rim adapted to clinch laterally the tyre $g$ by means of its beads and to confine the same by having the two parts of the tyre brought closer the one to the other under the action of the bolts $f$.

The rubber tyre $g$ is provided near the rim with an annular recess or groove $g^1$ which communicates with the exterior by means of ports or holes $e^2$ made in the rim.

The circulation of air in the recess $g^1$ takes place naturally in virtue of the tyre being flattened at the point of contact with the ground, so that this tyre is automatically cooled by this circulation of air.

Upon the sides of this wheel are the protecting cheeks made in two parts.

Each of these cheeks comprises a disc $h$ and a washer $h^1$; the washer covers slightly the disc.

The disc $h$ is secured to the axle $a$, while the washer $h^1$ is connected with the rim by means of bolts $d$ securing the central elastic system to the rim. In this way, the two parts of the cheeks are independent the one from the other, thereby allowing to bring the axle out of center during the operation.

Supposing the car to be loaded, but at rest, the axle $a$, under the action of this load, sinks in a vertical direction, the whole of the central elastic system has also sunk at same time as this axle and the tyre has become flat at the place where it comes in contact with the ground.

Now, when starting, the axle provided with the whole of the central elastic system will first make a slight rotary motion about itself before the wheel is carried along in this movement, which insures a great smoothness when starting.

When, in rolling, the wheel meets an obstacle such as a stone, for instance, the axle will shift horizontally, whilst the tyre first and then the central elastic system will absorb the shock progressively.

The tyre and the central elastic system will also progressively absorb the reactions due to the crossing of brooks, etc., according to the action of the tyre and to the action of the central elastic system.

The form, details, accessories, materials and sizes of this spring wheel may of course vary without departing in any way from the principle of this invention.

Claims:

1. A spring wheel comprising a collar adapted to be secured to an axle and provided with a plurality of radial and transversely extending open ended tubular members, a plurality of rubber members in each tubular member, and a rim provided on its inner face with a plurality of pockets in which the tubular members are secured.

2. A spring wheel, comprising a collar adapted to be secured to an axle and provided with a plurality of radial and transversely extending open ended tubular members, a plurality of cylindrical rubber members in each of the tubular members, a rim having on its inner face a plurality of pockets into which the tubular members extend, and bolts passing through the pockets of the rim and through the tubular members between the rubber members thereof.

3. A spring wheel, comprising a collar adapted to be secured to an axle and provided with a plurality of radial and transversely extending open ended tubular members, a plurality of cylindrical rubber members in each tubular member, a rim provided on its inner face with a plurality of pockets into which the tubular members extend, oppositely arranged cheeks, and bolts passing through the cheeks, the pockets and tubular members between the rubber members thereof.

4. A spring wheel, comprising a collar adapted to be secured to an axle and provided with a plurality of radial and transversely extending open ended tubular members, a socket in each member, a plurality of cylindrical rubber members in each tubular member around the socket, a rim provided on its inner face with inwardly projecting shells into which the tubular members project, cheeks on opposite sides of the wheel, and bolts passing through the cheeks, the shells and the sockets of the tubular members.

5. A spring wheel comprising an axle, a collar secured to the axle and provided with a plurality of radial and transversely extending tubular members, a plurality of rubber members in each tubular member, a rim provided on its inner face with a plurality of pockets, into which the tubular members extend, cheeks on opposite sides of the wheel and each formed of a disk secured to the axle and a ring overlapping the disk, and bolts passing through the said ring, the pockets and the tubular members between the rubber members thereof.

The foregoing specification of my improvements in spring-wheels for vehicles signed by me this 30th day of March, 1922.

HIPPOLYTE JEAN MARIE PENY.